(12) United States Patent
Chatry (10) Patent No.: US 9,443,344 B2
(45) Date of Patent: Sep. 13, 2016

(54) METHOD FOR RENDERING DATA OF A THREE-DIMENSIONAL SURFACE

(71) Applicant: Hexagon Technology Center GmbH, Heerbrugg (CH)

(72) Inventor: Olivier Chatry, Oslo (NO)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 242 days.

(21) Appl. No.: 14/275,389

(22) Filed: May 12, 2014

(65) Prior Publication Data

US 2014/0340399 A1  Nov. 20, 2014

(30) Foreign Application Priority Data

May 16, 2013  (EP) .................................. 13167982

(51) Int. Cl.
| | |
|---|---|
| *G06T 15/04* | (2011.01) |
| *G06T 15/40* | (2011.01) |
| *G06T 17/05* | (2011.01) |
| *G06T 1/60* | (2006.01) |

(52) U.S. Cl.
CPC ................. *G06T 15/04* (2013.01); *G06T 1/60* (2013.01); *G06T 15/40* (2013.01); *G06T 17/05* (2013.01); *G06T 2200/04* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 6,496,189 B1 | 12/2002 | Yaron et al. | |
| 6,755,803 B1 | 6/2004 | Le et al. | |
| 7,089,063 B2 | 8/2006 | Lesh et al. | |
| 7,491,188 B2 | 2/2009 | Holman et al. | |
| 7,551,172 B2 | 6/2009 | Yaron et al. | |
| 7,901,374 B2 | 3/2011 | Seto et al. | |
| 2004/0104915 A1* | 6/2004 | Mori ..................... | G06T 15/005 345/561 |
| 2005/0171754 A1 | 8/2005 | Santodomingo et al. | |
| 2009/0051160 A1 | 2/2009 | Kanner | |

(Continued)

FOREIGN PATENT DOCUMENTS

| | | |
|---|---|---|
| JP | 08-275953 A | 10/1996 |
| JP | 2003-053215 A | 2/2003 |

(Continued)

OTHER PUBLICATIONS

European Search Report dated Jan. 31, 2014 as received in Application No. EP 13 16 7982.

(Continued)

*Primary Examiner* — James A Thompson
(74) *Attorney, Agent, or Firm* — Maschoff Brennan (57) ABSTRACT

Some embodiments of the invention pertain to a method for displaying a representation of a portion of a three-dimensional surface by rendering data representing physical features of the portion of the three-dimensional surface. The data may be apportioned into a multitude of tiles at a plurality of different detail levels. The representation may include a multitude of image pixels and/or a buffer being assigned to each image pixel. The method may also include identifying tiles that need to be rendered, and rendering the identified tiles. At least a portion of a tile may be displayed by a multitude of image pixels, by assigning an unambiguous distance value to each of the identified tiles, and storing a default buffer value in the buffers of the image pixels. The rendering may include comparing the buffer values of image pixels and the distance value of a presently rendered tile.

22 Claims, 7 Drawing Sheets

(56) References Cited

U.S. PATENT DOCUMENTS

| | | |
|---|---|---|
| 2010/0079522 A1 | 4/2010 | Seto et al. |
| 2011/0121558 A1 | 5/2011 | Kanner |
| 2011/0316854 A1 | 12/2011 | Vandrovec |
| 2013/0147846 A1* | 6/2013 | Kalai .................. G06T 1/60 345/660 |

FOREIGN PATENT DOCUMENTS

| | | |
|---|---|---|
| JP | 2003-533268 A | 2/2003 |
| JP | 2004-533883 A | 11/2004 |
| JP | 2008-82202 A | 4/2008 |
| JP | 2008-515567 A | 5/2008 |
| JP | 2009-072574 A | 4/2009 |
| JP | 2010-082056 A | 4/2010 |
| JP | 2010-115375 A | 5/2010 |
| WO | 2005/089434 A2 | 9/2005 |

OTHER PUBLICATIONS

Adobe®: "Using Adobe® Photoshop® Elements 7", Adobe System Incorporated, 2008 pp. 469.

Möller et al., "Real-Time Rendering" Third Edition, A K Peters/CRC Press, 2008, pp. 21-25.

Goss et al., "Texture Tile Visibility Determination for Dynamic Texture Loading", Proceeding HWWS '98 Proceedings of the ACM Siggraph/Eurographics Workshop on Graphics Hardware, Aug. 31, 1998, pp. 55-60.

* cited by examiner

| tile | distance | No. |
|---|---|---|
| 6472237568.dat | 0.3221 | 255 |
| 1467652533.dat | 0.4522 | 254 |
| 6787222123.dat | 0.7810 | 253 |
| 3325576233.dat | 1.2556 | 252 |
| . | . | . |
| . | . | . |
| . | . | . |
| 7411148022.dat | 13.4421 | 116 |
| 1922424232.dat | 14.0011 | 115 |
| 7774223451.dat | 14.8752 | 114 |
| 2044386311.dat | 15.9327 | 113 |

METHOD FOR RENDERING DATA OF A THREE-DIMENSIONAL SURFACE

FIELD OF THE INVENTION

The present invention pertains to a method for rendering data of a three-dimensional surface, particularly a terrain, having a multitude of detail levels, the method particularly preventing the formation of rendering artifacts due to overlapping.

BACKGROUND

Rendering is the process of generating an image from a model such as a three-dimensional terrain model by means of a computer programme. The three-dimensional terrain model to be rendered can be a grid containing elevation data, such as a Digital Elevation Model (DEM), a Digital Surface Model (DSM) or a Digital Terrain Model (DTM). The digital model may comprise data of a limited area, such as a model of a particular city or landscape, as well as a model of a continent or even a complete planet.

When rendering three-dimensional terrain data in a computer, it is important to partition the data in such a way that not all of the data needs to be stored in the memory of the device, thus reducing the amount of memory needed on the device. This is especially important for mobile devices, which generally have particularly limited memory capacities.

Computer rendering of three-dimensional terrain images is generally known from prior art: U.S. Pat. No. 7,551,172 B2 discloses a method for sending information representing three-dimensional images over a network, and U.S. Pat. No. 6,496,189 B1 discloses a method and apparatus for displaying images of an area as seen from an interactively chosen viewpoint on a remote device.

In a common method for rendering three-dimensional terrain data, a tree is used, which divides the data into tiles and levels of detail, wherein each level of detail comprises more information than the previous one, thus allowing zooming in or out while keeping the rendering quality and preserving the amount of memory needed on the device. Disadvantageously, if the tiles are displayed three-dimensionally, overlapping tiles on top of each other will appear, i.e. tiles that cover the same area, but have a different detail level. As these tiles do not comprise the exactly same amount of information, the tiles are not perfectly overlapping. This problem appears, because tiles of a higher detail level, i.e. tiles comprising more information, should be displayed on top of tiles of a lower detail level, i.e. tiles including less information. But due to overlapping, it may happen that some part of a tile of a lower detail level is displayed—partially or completely—on top of another tile of a higher detail level, leading to so-called artifacts.

Various methods to remove these artifacts are known from prior art. One method employs the use of a "clipping plane". For avoiding overlapping, such a method comprises determining for each tile, which area of the tile should be rendered. Disadvantageously, this method is relatively slow, especially on mobile devices, since complex 3D calculus needs to take place as well as complex logic for determining the area of the tile that needs to be rendered.

Another method uses the "depth offset". Therein, an offset is added to each tile using its level of detail value. The main problem of this approach is that it adds a "hovering" effect on all the tiles on top of each other and does not work if the amount of data on the data levels varies strongly.

SUMMARY

Some embodiments of the present invention provide for an enhanced method for rendering three-dimensional data.

Some embodiments of the invention provide for a method that avoids the disadvantages of the methods known from prior art.

Some embodiments of the invention provide for such a method for rendering data of a three-dimensional terrain model.

Some embodiments of the present invention provide for such a method being executable on a hand-held mobile device, and to provide a hand-held device for execution of said method.

Some embodiments of the invention provide for a computer program product for execution of said method, in particular on a hand-held device.

A method for displaying a representation of a portion of a three-dimensional surface by rendering data representing physical features of the portion of the three-dimensional surface, the data being apportioned into a multitude of tiles at a plurality of different detail levels, the representation comprising a multitude of image pixels, a buffer being assigned to each image pixel, with
  identifying tiles that need to be rendered,
  rendering the identified tiles, wherein at least a portion of
    a tile is displayed by a multitude of image pixels,
according to the invention comprises
  assigning an unambiguous distance value to each of the
    identified tiles, and
  storing a default buffer value in the buffers of the image
    pixels,
wherein the rendering comprises comparing the buffer values of image pixels and the distance value of a presently rendered tile.

In one embodiment of the method, rendering is performed sequentially for every tile and in the order of the distance value of the tiles.

In one embodiment of the method, depending on the result of comparing the buffer value and the distance value, the rendering comprises storing the distance value as a new buffer value in the buffer of the respective pixel and displaying data information from the tile in the pixel.

In a preferred embodiment of the method, the buffer is a stencil buffer. For storing the distance value, particularly the stencil buffer is employed. The stencil buffer is an extra buffer—usually with a depth of one byte per pixel—that is found on modern graphics hardware, additionally to the colour buffer and the depth buffer of a pixel.

In one embodiment of the method, the representation is a two- or three-dimensional image, which is displayable to a user on a display.

In another embodiment of the method, the data is a Digital Elevation Model (DEM), Digital Surface Model (DSM) or Digital Terrain Model (DTM).

According to one embodiment of the method of the present invention, the tiles to be rendered are sorted according to their position in the image and then rendered sequentially, thus avoiding complex 3D calculus. In this embodiment, the method comprises sorting the tiles in a list according to a location of the tiles with respect to the representation, wherein
  the distance value is assigned according to a position of
    the tile in the list, and the tiles are rendered sequentially, the rendering beginning with a first tile in the list.

Particularly, the location of the tiles is a distance between the tiles and an observation point, e.g. a virtual position of a virtual camera, or between the tiles and a centre point of the representation, particularly a distance between the observation point or the centre point of the representation and the centre of a bounding box of each tile, or a distance between the observation point or the centre point of the representation and the nearest side of the bounding box.

More particularly, the default buffer value and the distance value that is assigned to the first tile in the list are the minimum and maximum values in a number range of the buffer. In particular, the buffer is an 8 bit buffer and either
  the buffer value is 0 and the distance value assigned to the first tile in the list is 255, or
  the buffer value is 255 and the distance value assigned to the first tile in the list is 0.

In a particular embodiment of the method, for every tile in the list the distance value is
  decreased by one, particularly if the distance value that is assigned to the first tile in the list is a maximum value in a number range of the buffer, or
  increased by one, particularly if the distance value that is assigned to the first tile in the list is a minimum value in a number range of the buffer.

In one embodiment of the method, comparing comprises determining whether a buffer value of a pixel or a distance value of a presently rendered is smaller than the other. If the distance value assigned to the nearest tile is larger than the default buffer value stored in the buffers of the image pixels, comparing comprises determining whether the present buffer value of a pixel is smaller than the distance value of a presently rendered tile, and if the distance value assigned to the nearest tile is smaller than the default buffer value stored in the buffers of the image pixels, comparing comprises determining whether the present buffer value of a pixel is larger than the distance value of a presently rendered tile. If the result of said determining is positive, the distance value is stored as a new buffer value in the buffer of the respective pixel and data information from the tile is displayed in the respective pixel.

In a further embodiment, the method is executed on a mobile device comprising a display for displaying the representation to a user, the mobile device particularly being a navigation device, a mobile phone, in particular a Smartphone, or a tablet computer.

One embodiment of the method comprises
  identifying tiles that need to be rendered,
  sorting the tiles according to their distance to a point of view,
  assigning a distance value to each of the tiles according to the order of their distance,
  assigning to a buffer for all pixels a default buffer value of zero, and
  rendering the tiles subsequently in the order of their distance value, starting with the nearest tile.

The invention also relates to a mobile device for execution of said method.

A mobile device according to the invention comprises a display adapted for displaying a representation of a portion of a three-dimensional surface, and a rendering unit for rendering data representing physical features of the portion of the three-dimensional surface, the data being apportioned into a multitude of tiles at a plurality of different detail levels, the representation comprising a multitude of image pixels, each image pixel having a buffer, wherein the rendering unit is adapted for
  identifying tiles that need to be rendered,
  assigning an unambiguous distance value to each of the identified tiles,
  storing a default buffer value in the buffers of the image pixels, and
  rendering the identified tiles, wherein at least a portion of a tile is displayed by a multitude of image pixels, and wherein the rendering comprises comparing the buffer values of image pixels and the distance value of a presently rendered tile.

In one embodiment of the mobile device, the rendering unit comprises a sorting algorithm, adapted for sorting the tiles in a list according to a location of the tiles in the representation, wherein
  the distance value is assigned according to a position of the tile in the list, and
  the tiles are rendered sequentially, the rendering beginning with a first tile in the list.

In one embodiment of the mobile device, the rendering unit is adapted for storing the distance value of a presently rendered tile as a new buffer value in the buffer of the respective pixel.

In another embodiment, the mobile device comprises locating means, particularly a GNSS receiver, for detecting a present location of the device.

In a further embodiment, the mobile device comprises communicating means for wirelessly receiving the data for rendering from an external server.

The invention furthermore relates to a computer programme product for execution of said method.

A computer programme product according to the invention, comprises programme code which is stored on a machine-readable medium, or being embodied by an electromagnetic wave comprising a programme code segment, and has computer-executable instructions for performing, in particular when run on calculation means of a mobile device according to the invention, the following steps of the method according to the invention:
  identifying tiles that need to be rendered,
  assigning an unambiguous distance value to each of the identified tiles,
  storing a default buffer value in the buffers of the image pixels, and
  rendering the identified tiles, wherein at least a portion of a tile is displayed by a multitude of image pixels, and wherein the rendering comprises comparing the buffer values of image pixels and the distance value of a presently rendered tile.

BRIEF DESCRIPTION OF THE DRAWINGS

The invention in the following will be described in detail by referring to exemplary embodiments that are accompanied by figures, in which.

DETAILED DESCRIPTION

Figure 1:
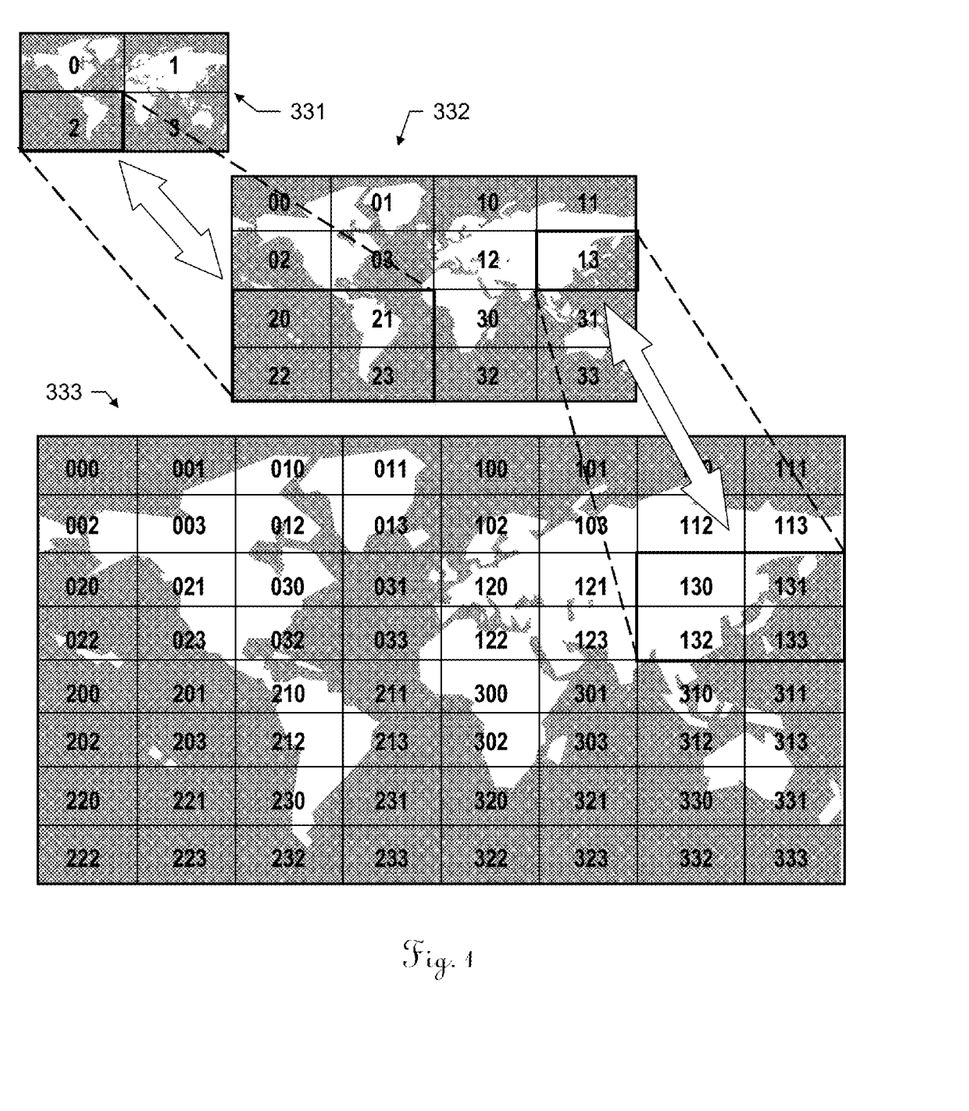
FIG. 1 shows the distribution of tiles in different detail levels of a representation of a terrain.

FIG. 1 shows an example for a representation of a terrain in three different detail levels 331-333. The representation is subdivided into a multitude of tiles, each of which particularly comprising a bitmap of a part of the representation. Each tile is assigned a number from which its position and detail level can be derived. In particular, each tile is comprised by a certain data file. The first detail level comprises the lowest amount of details.

In this example, in the first detail level 331 the terrain is subdivided into the four rectangular tiles with the numbers "0", "1", "2" and "3", each corresponding to four tiles of the second detail level 332 which is, thus, subdivided into sixteen tiles. Tile "2" of the first detail level e.g. corresponds to tiles "20", "21", "22" and "23" of the second detail level. Each of the second detail level tiles corresponds to four tiles of the next higher level, the third detail level 333, so that this level is subdivided into sixty-four tiles. Tile "13" of the second detail level e.g. corresponds to tiles "130", "131", "132" and "133" of the second detail level.

Figure 2:
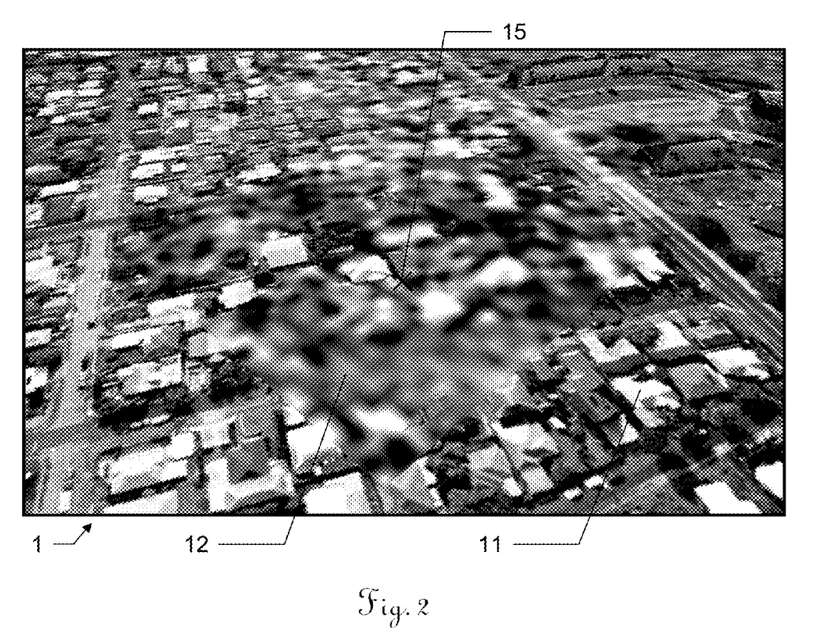
FIG. 2 shows an image of a rendered three-dimensional terrain comprising artifacts.

FIG. 2 shows an image 1 after rendering, being displayed to a user in a virtual camera view. The image 1 is composed of a multitude of pixels (not shown) and has a centre point 15. The image is a representation of a three-dimensional landscape 11 showing objects in a high detail level, the representation being composed by a multitude of tiles (not shown). In the middle of the image 1 an artifact 12 is shown, displaying the landscape in a considerably lower detail level.

The tiles of the image 1 are displayed three-dimensionally with overlapping tiles on top of each other, i.e. tiles that at least partially cover the same area, but have a different detail level. As these tiles do not comprise the exactly same amount of information, the tiles are not perfectly fitting. Tiles of a higher detail level, i.e. tiles comprising more information, are ought to be displayed on top of tiles of a lower detail level, i.e. tiles including fewer information. But due to overlapping, some part of a tile of a lower detail level can be displayed on top of another tile of a higher detail level, leading to the depicted artifact 12. It is an object of the present invention to avoid the formation of such artifacts 12, by adding a specific value to every tile and every pixel of the image 1.

Figure 3:
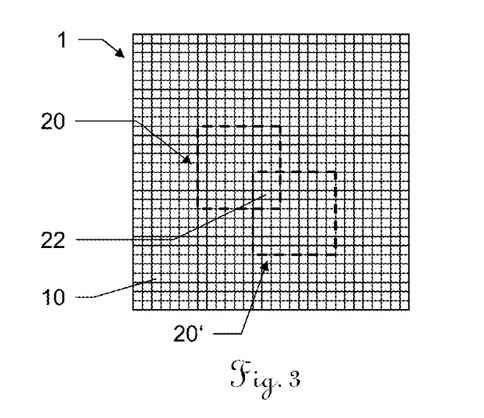
FIG. 3 shows an overlapping of two tiles.

FIG. 3 schematically shows two tiles 20,20'—one of which particularly having a higher detail level than the other—of a representation 1 that have an overlapping area 22. The representation 1 comprises a multitude of pixels 10, wherein for the overlapping area 22 two sets of pixels are available to be displayed. Preferably, those pixels belonging to the tile 20,20' having a desired detail level should be displayed. Displaying the wrong set of pixels generally leads to the formation of an artifact.

Figure 4:
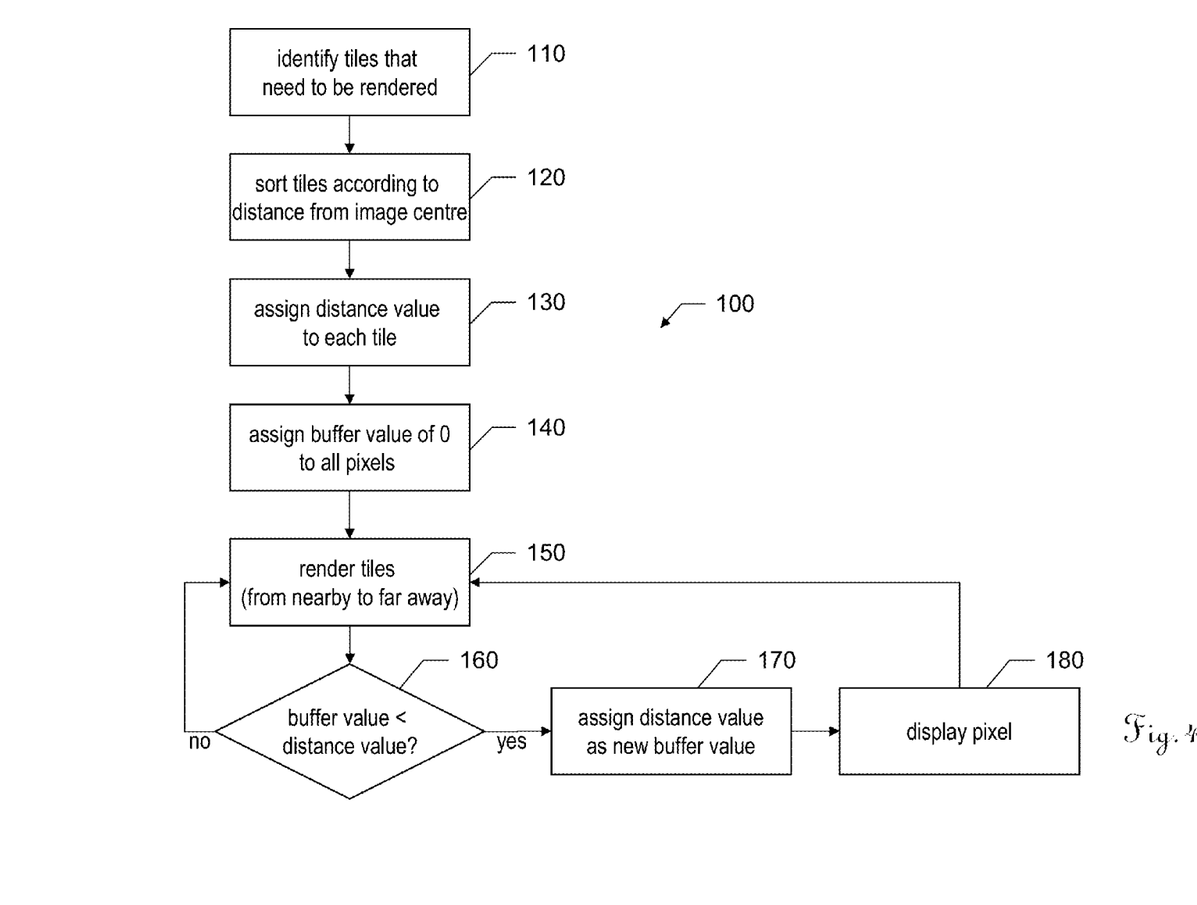
FIG. 4 is a flow chart illustrating an exemplary embodiment of a method according to the invention.

FIG. 4 shows a flow chart describing an exemplary embodiment of a method 100 according to the invention. The depicted method 100 comprises the following steps 110-180:

In step 110, tiles that need to be rendered are identified. In particular, these are all tiles that are visible from a present point of view and thus are to be displayed to a user.

In step 120, the identified tiles are sorted in a list according to their position in an image, in particular the centre of the image to be displayed, particularly beginning with the nearest to the centre of the image. For this sorting, which particularly can be used for determining the rendering sequence of the tiles, i.e. which tile should be rendered first, many different known sorting algorithms can be employed. For sorting the tiles, for instance the distance from the centre of the image to be displayed to the centre of a bounding box of each tile can be used, or the distance to the nearest side of the bounding box.

In step 130, each of the tiles is assigned an unambiguous distance value according to its respective position in the list, e.g. so that the nearest tile is assigned the highest distance value and the farthest is assigned the lowest distance value—for instance starting with a value of 255 for the nearest tile, decrementing this value by one for each tile in the list.

In step 140, a default buffer value is assigned in a stencil buffer to all pixels of the image that is to be displayed. The stencil buffer is an extra buffer working on integer values—usually with a depth of one byte per pixel—additionally to the colour buffer and the depth buffer of a pixel. Normally, the stencil buffer is used to limit the area of rendering. If the nearest tile is assigned the highest distance value, as described for step 130 above, the pixels are assigned a default buffer value of zero.

In step 150, the tiles are rendered sequentially, particularly in the order of their position in the list, i.e. starting with the nearest tile. Sequentially, for each pixel of the portion of the image that would be covered by the presently rendered tile, the following steps are performed.

In step 160, the present buffer value of the pixel is read. For the first rendered tile the read buffer value of all pixels will be the default buffer value assigned in step 140. The read buffer value of the pixel is then compared with the distance value of the corresponding, i.e. the presently rendered, tile. If the buffer value of the pixel is smaller than the distance value of the tile, the method continues with step 170. Otherwise, i.e. if the buffer value of the pixel is equal or larger than the distance value of the tile, the respective pixel is discarded, i.e. neither displayed nor otherwise processed, and the method continues with repeating step 150 for the next pixel, or—if all pixels corresponding to the presently rendered tile already have been rendered—with the first pixel corresponding to the next tile, respectively.

In step 170, the distance value of the presently rendered tile is assigned as a new buffer value to the stencil buffer of the pixel, thus replacing the default buffer value or any other present buffer value, respectively, of the pixel.

In step 180, the pixel is displayed or otherwise processed, e.g. stored in a data storage system. Then, the method continues with step 150, rendering the next pixel corresponding to the presently rendered tile, or of the next tile, respectively.

The method 100 ends when all pixels of the image display a portion of one of the tiles.

Obviously, in step 130, it is also possible to assign the lowest distance value to the nearest tile and the highest distance value to the farthest tile, e.g. starting with zero for the nearest tile. In step 140, the assigned default buffer value would then be the highest possible value—in an 8 bit buffer working on integer values this would be 255. In step 160 the comparing of the two values would also have to be adapted accordingly, i.e. if the buffer value of the pixel exceeds the distance value of the tile, the method continues with step 170, and if the buffer value of the pixel is equal or smaller than the distance value of the tile, the respective pixel is discarded.

Figure 5A:
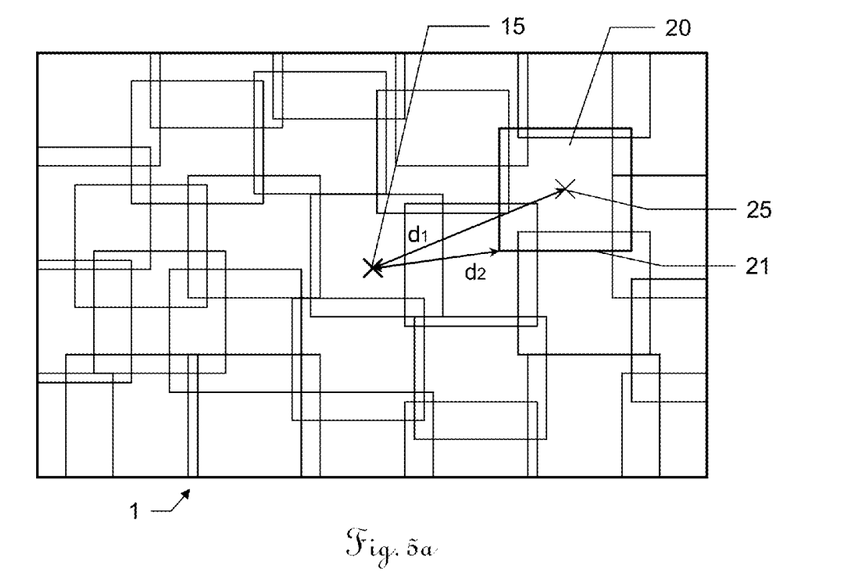
FIG. 5a illustrates exemplary steps of determining a distance of a tile.

In FIG. 5a an image 1 that is to be displayed to a user and is formed by a multitude of overlapping tiles is depicted schematically. FIG. 5a illustrates the determination of the distances to the tiles for sorting the tiles according to their distance. A central point 15 of the image 1 is shown, from which a distance to each of the tiles is determined. Two possible distances are shown for one exemplary tile 20. The distance $d_1$ is measured from the central point 15 to the centre 25 of the respective tile 20, particularly the centre of a bounding box 21 of the tile. The distance $d_2$ is measured from the central point 15 to the nearest point on the edge of the tile 20, particularly the nearest point of the bounding box 21. Alternatively, the distance from the observation point, i.e. a position of a virtual camera, can be determined.

Figure 5B:
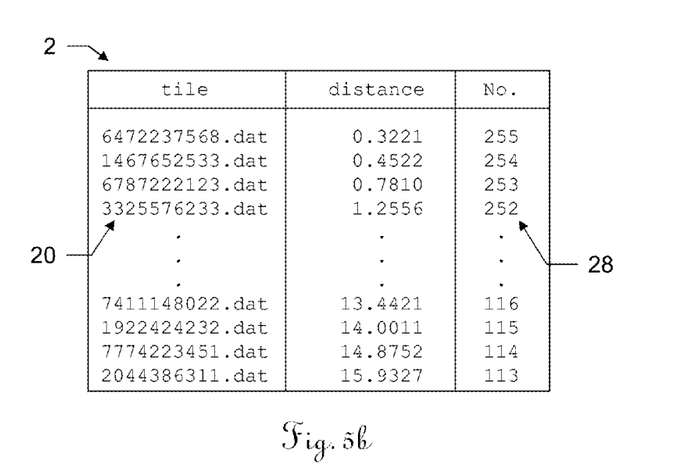
FIG. 5b shows a tile list, the tiles being sorted according to their distance.

After a distance has been determined for every tile to be rendered, the tiles are sorted in a list according to their distance. An example of such a list 2 is shown in FIG. 5b. Every tile 20 is then assigned an unambiguous distance value 28 according to the tile's position in the list 2. Particularly (as shown here), the nearest tile (having the lowest distance) is assigned the highest distance value 28, and for every following tile in the list 2 the distance value 28 is decremented by one. If the buffer used for storing the buffer value, in particular the stencil buffer, is an 8 bit buffer, the distance value for the nearest value could be 255.

FIGS. 6a-d show an image 1 comprising a multitude of pixels 10—in this simplified example a 6×6 array of pixels 10. The figures illustrate the subsequent rendering of a number of tiles 20—each tile 20 in this simplified example corresponding to a 3×3 array of pixels of the image 1. Each pixel 10 of the image 1 is shown with its actual buffer value 18. The buffer value 18 is assigned to a stencil buffer of the respective pixel, the stencil buffer being an 8 bit buffer.

Figure 6A:
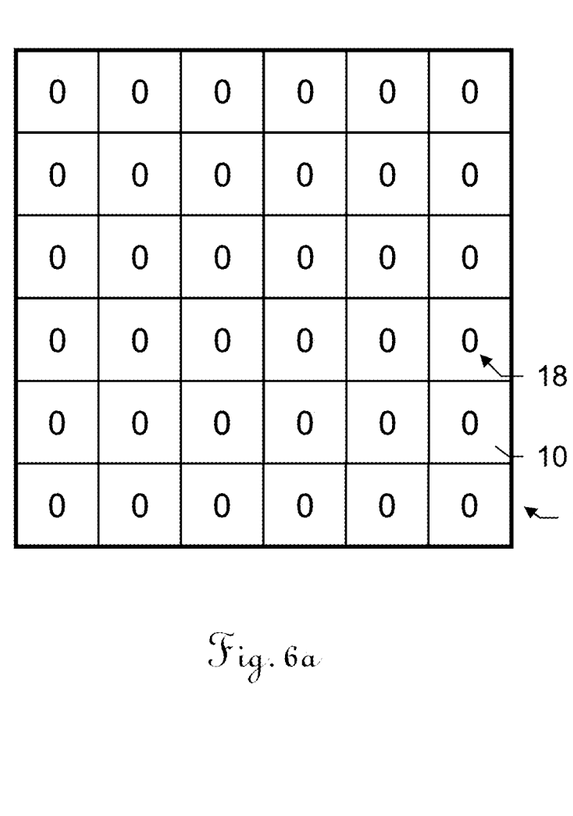
FIGS. 6a-d illustrate an example of subsequent rendering of tiles.

In FIG. 6a, the stencil buffer of all pixels 10 of the image 1 is assigned a default buffer value 18 of zero—this is described in FIG. 4 for step 140.

Figure 6B:
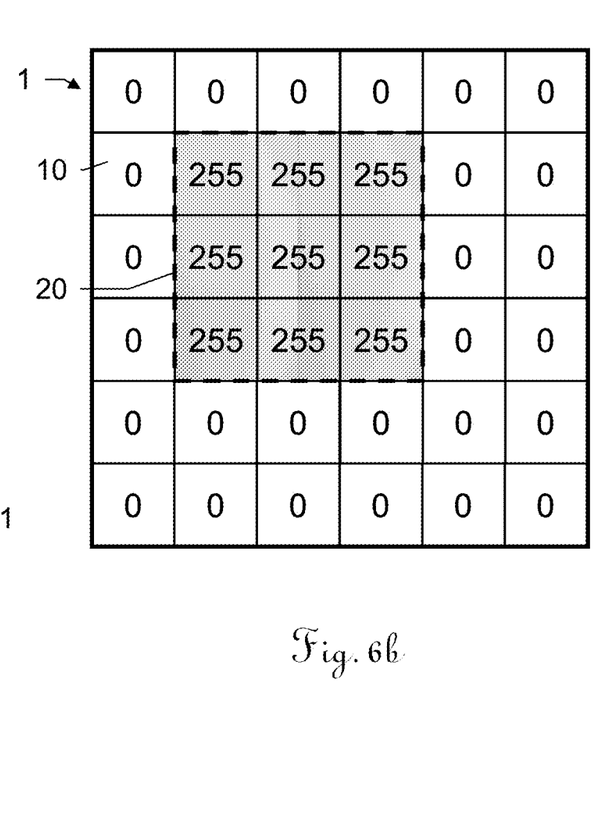

In FIG. 6b a situation is depicted in which a first tile 20 has been rendered that is assigned a distance value of 255—the highest possible integer value when using an 8 bit buffer. For each of the nine pixels 10 of the image 1 that the tile 20 occupies, the current buffer value 18 of the respective pixel and the distance value of the presently rendered tile 20 are compared (step 160 in FIG. 4). As the distance value exceeds the buffer value 18 of all nine pixels (255>0), the distance value is assigned to the nine pixels' stencil buffer as a new buffer value 18 (step 170 in FIG. 4). The data of the tile is then displayed by the nine pixels 10 of the image 1 (step 180 in FIG. 4); this is represented by a dotted background.

Figure 6C:
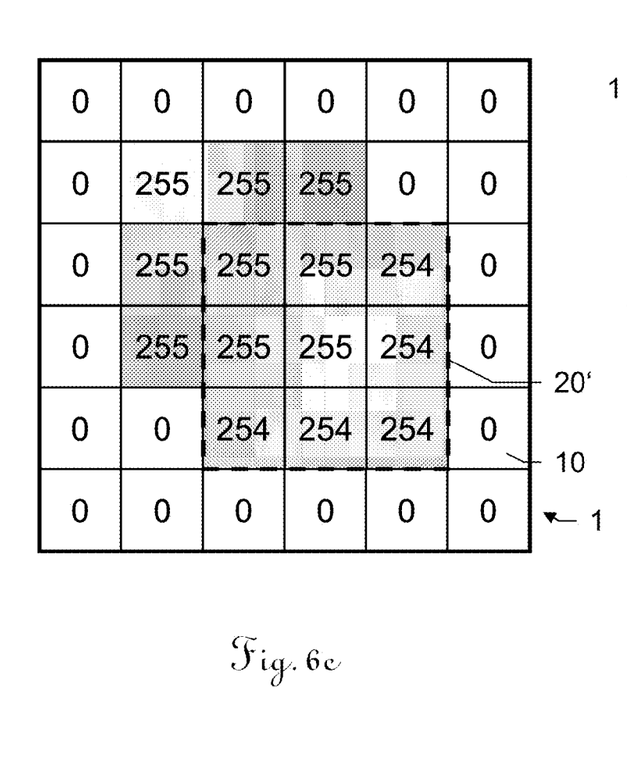

In FIG. 6c a second tile 20' which is assigned a distance value lower than that of the first tile 20—here a value of 254—is rendered subsequently to the first tile 20. This second tile 20' partially overlaps with the first tile. Again, the nine buffer values 18 and the distance value are compared (step 160 in FIG. 4). In the overlapping area with the first tile, the distance value is smaller than the present buffer value 18 (254<255), so that this area of the second tile 20' is discarded without further action, i.e. without displaying this area of the second tile 20'. This means that the respective pixels 10 of the image 1 remain unaltered. For the remaining five pixels 10 the distance value exceeds the buffer value 18 (254>0), so that the distance value is assigned to the pixels' stencil buffer as a new buffer value 18 (step 170 in FIG. 4)

and this area of the tile 20' is displayed by the five pixels 10 (step 180 in FIG. 4)—again represented by the dotted background.

Figure 6D:
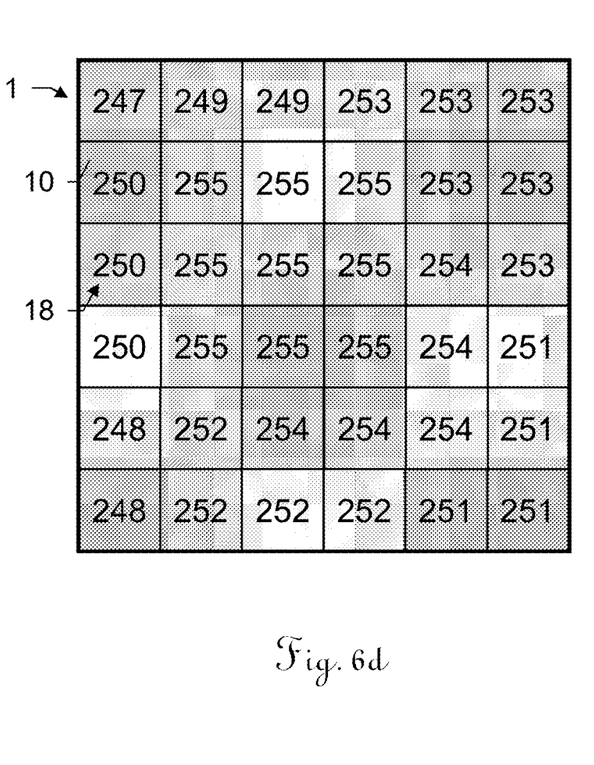

FIG. 6d shows the image 1 after the rendering of seven further tiles (not shown) having distance values of 253, 252, 251, 250, 249, 248 and 247, respectively. As a result, all pixels 10 of the image 1 are assigned one of the tiles' distance values as a new buffer value 18.

Figure 7:
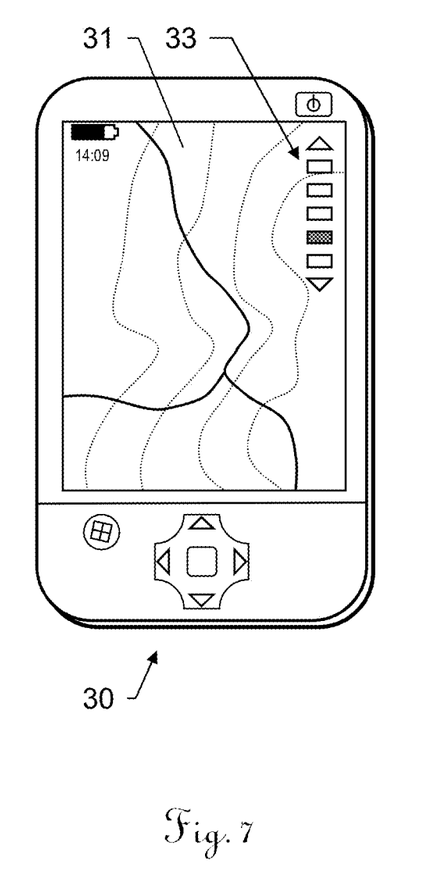
FIG. 7 shows an exemplary embodiment of a hand-held mobile device according to the invention.

FIG. 7 shows an exemplary embodiment of a mobile device 30 according to the invention. The device is handheld and comprises a rendering unit (not shown) for rendering data representing physical features of a portion of a three-dimensional surface, particularly by the method according to the invention as described above. The mobile device furthermore comprises a display 31, particularly designed as a touch-screen, the display 31 being adapted for displaying an image based on the data rendered by the rendering unit. The display 31 comprises a zoom functionality 33 for zooming in and out, i.e. changing the detail level of the displayed data. Preferably the device comprises locating means, such as a GNSS receiver, and communicating means for wirelessly receiving the data from a server.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for displaying a representation of a portion of a three-dimensional surface by rendering data representing physical features of the portion of the three-dimensional surface, the data being apportioned into a multitude of tiles at a plurality of different detail levels, the representation comprising a multitude of image pixels, a buffer being assigned to each image pixel, the method comprising
   identifying tiles that need to be rendered,
   rendering the identified tiles, wherein at least a portion of a tile is displayed by a multitude of image pixels,
   assigning an unambiguous distance value to each of the identified tiles, and
   storing a default buffer value in the buffers of the image pixels,
   wherein the rendering comprises comparing the buffer values of image pixels and the distance value of a presently rendered tile,
   wherein:
   if the distance value assigned to the nearest tile is larger than the default buffer value stored in the buffers of the image pixels, comparing comprises determining whether the present buffer value of a pixel is smaller than the distance value of a presently rendered tile, and
   if the distance value assigned to the nearest tile is smaller than the default buffer value stored in the buffers of the image pixels, comparing comprises determining whether the present buffer value of a pixel is larger than the distance value of a presently rendered tile,
   wherein, if the result of said determining is positive, the distance value is stored as a new buffer value in the buffer of the respective pixel and data information from the tile is displayed in the pixel.

2. The method according to claim 1, wherein rendering is performed sequentially for every tile and in the order of the distance value of the tiles.

3. The method according to claim 1, wherein the rendering comprises storing the distance value as a new buffer value in the buffer of the respective pixel and displaying data information from the tile in the pixel, based on the result of comparing the buffer value and the distance value.

4. The method according to claim 1, wherein the buffer is a stencil buffer.

5. The method according to claim 1, wherein the data is a Digital Elevation Model, Digital Surface Model, or Digital Terrain Model.

6. The method according to claim 1, wherein the representation is a two- or three-dimensional image, which is displayable to a user on a display.

7. The method according to claim 1, further comprising sorting the tiles in a list according to a location of the tiles with respect to the representation, wherein
    the distance value is assigned according to a position of the tile in the list, and
    the tiles are rendered sequentially, the rendering beginning with a first tile in the list.

8. The method according to claim 7, wherein the location of the tiles is a distance between the tiles and an observation point or a center point of the representation.

9. The method according to claim 7, wherein the location of the tiles is a distance between the observation point or the center point of the representation and the center of a bounding box of each tile.

10. The method according to claim 7, wherein for every tile in the list, the distance value is decreased by one, if the distance value that is assigned to the first tile in the list is a maximum value in a number range of the buffer.

11. The method according to claim 7, wherein for every tile in the list, the distance value is increased by one, if the distance value that is assigned to the first tile in the list is a minimum value in a number range of the buffer.

12. The method according to claim 1, wherein the method is executed on a mobile device comprising a display for displaying the representation to a user, wherein the mobile device comprises:
    a navigation device,
    a smartphone, or
    a tablet computer.

13. A method for displaying a representation of a portion of a three-dimensional surface by rendering data representing physical features of the portion of the three-dimensional surface, the data being apportioned into a multitude of tiles at a plurality of different detail levels, the representation comprising a multitude of image pixels, a buffer being assigned to each image pixel, the method comprising:
    identifying tiles that need to be rendered,
    sorting the tiles in a list according to a location of the tiles with respect to the representation,
    sequentially rendering the identified tiles, the rendering beginning with a first tile in the list, wherein at least a portion of a tile is displayed by a multitude of image pixels,
    assigning an unambiguous distance value to each of the identified tiles according to a position of the tile in the list, and
    storing a default buffer value in the buffers of the image pixels, wherein the rendering comprises comparing the buffer values of image pixels and the distance value of a presently rendered tile,
    wherein the location of the tiles is a distance between the observation point or the center point of the representation and the nearest side of the bounding box.

14. A method for displaying a representation of a portion of a three-dimensional surface by rendering data representing physical features of the portion of the three-dimensional surface, the data being apportioned into a multitude of tiles at a plurality of different detail levels, the representation comprising a multitude of image pixels, a buffer being assigned to each image pixel, the method comprising:
    identifying tiles that need to be rendered,
    sorting the tiles in a list according to a location of the tiles with respect to the representation,
    sequentially rendering the identified tiles, the rendering beginning with a first tile in the list, wherein at least a portion of a tile is displayed by a multitude of image pixels,
    assigning an unambiguous distance value to each of the identified tiles according to a position of the tile in the list, and
    storing a default buffer value in the buffers of the image pixels, wherein the rendering comprises comparing the buffer values of image pixels and the distance value of a presently rendered tile,
    wherein the default buffer value and the distance value that is assigned to the first tile in the list are the minimum and maximum values in a number range of the buffer, wherein the buffer is a 23 bit buffer and the default buffer value is 0 and the distance value assigned to the first tile in the list is 255,
    wherein the rendering comprises comparing the buffer values of image pixels and the distance value of a presently rendered tile.

15. A method for displaying a representation of a portion of a three-dimensional surface by rendering data representing physical features of the portion of the three-dimensional surface, the data being apportioned into a multitude of tiles at a plurality of different detail levels, the representation comprising a multitude of image pixels, a buffer being assigned to each image pixel, the method comprising:
    identifying tiles that need to be rendered,
    sorting the tiles in a list according to a location of the tiles with respect to the representation,
    sequentially rendering the identified tiles, the rendering beginning with a first tile in the list, wherein at least a portion of a tile is displayed by a multitude of image pixels,
    assigning an unambiguous distance value to each of the identified tiles according to a position of the tile in the list, and
    storing a default buffer value in the buffers of the image pixels, wherein the rendering comprises comparing the buffer values of image pixels and the distance value of a presently rendered tile,
    wherein the default buffer value and the distance value that is assigned to the first tile in the list are the minimum and maximum values in a number range of the buffer, wherein the buffer is a 23 bit buffer and the default buffer value is 255 and the distance value assigned to the first tile in the list is 0,
    wherein the rendering comprises comparing the buffer values of image pixels and the distance value of a presently rendered tile.

16. A mobile device comprising:
    a display adapted for displaying a representation of a portion of a three-dimensional surface, and
    a rendering unit for rendering data representing physical features of the portion of the three-dimensional surface, the data being apportioned into a multitude of tiles at a plurality of different detail levels, the representation comprising a multitude of image pixels, a buffer being assigned to each image pixel, wherein
    the rendering unit is adapted for:
        identifying tiles that need to be rendered, assigning an unambiguous distance value to each of the identified tiles, and storing a default buffer value in the buffers of the image pixels, rendering the identified tiles, wherein at least a portion of a tile is displayed by a multitude of image pixels, and wherein the rendering comprises comparing the buffer values of image pixels and the distance value of a presently rendered tile, wherein:

if the distance value assigned to the nearest tile is larger than the default buffer value stored in the buffers of the image pixels, comparing comprises determining whether the present buffer value of a pixel is smaller than the distance value of a presently rendered tile, and if the distance value assigned to the nearest tile is smaller than the default buffer value stored in the buffers of the image pixels, comparing comprises determining whether the present buffer value of a pixel is larger than the distance value of a presently rendered tile, wherein, if the result of said determining is positive, the rendering unit is adapted for storing the distance value as a new buffer value in the buffer of the respective pixel and the display is adapted for displaying data information from the tile in the pixel.

17. The mobile device according to claim 16, wherein the rendering unit comprises a sorting algorithm, adapted for sorting the tiles in a list according to a location of the tiles in the representation, wherein the distance value is assigned according to a position of the tile in the list, and the tiles are rendered sequentially, the rendering beginning with a first tile in the list, and/or is adapted for storing the distance value of a presently rendered tile as a new buffer value in the buffer of the respective pixel.

18. The mobile device according to claim 16, further comprising:

a GNSS receiver, and/or communicating means for wirelessly receiving the data from a server.

19. A non-transitory computer readable medium having computer-executable instructions stored thereon that when executed by a computer perform a method for displaying a representation of a portion of a three-dimensional surface by rendering data representing physical features of the portion of the three-dimensional surface, the data being apportioned into a multitude of tiles at a plurality of different detail levels, the representation comprising a multitude of image pixels, a buffer being assigned to each image pixel, the method comprising the following:

identifying tiles that need to be rendered, rendering the identified tiles, wherein at least a portion of a tile is displayed by a multitude of image pixels, assigning an unambiguous distance value to each of the identified tiles, storing a default buffer value in the buffers of the image pixels, and rendering the identified tiles, wherein at least a portion of a tile is displayed by a multitude of image pixels, and wherein the rendering comprises comparing the buffer values of image pixels and the distance value of a presently rendered tile, wherein:

if the distance value assigned to the nearest tile is larger than the default buffer value stored in the buffers of the image pixels, comparing comprises determining whether the present buffer value of a pixel is smaller than the distance value of a presently rendered tile, and if the distance value assigned to the nearest tile is smaller than the default buffer value stored in the buffers of the image pixels, comparing comprises determining whether the present buffer value of a pixel is larger than the distance value of a presently rendered tile, wherein, if the result of said determining is positive, the distance value is stored as a new buffer value in the buffer of the respective pixel and data information from the tile is displayed in the pixel.

20. A mobile device comprising:

a display adapted for displaying a representation of a portion of a three-dimensional surface, and a rendering unit for rendering data representing physical features of the portion of the three-dimensional surface, the data being apportioned into a multitude of tiles at a plurality of different detail levels, the representation comprising a multitude of image pixels, a buffer being assigned to each image pixel, wherein the rendering unit is adapted for identifying tiles that need to be rendered and comprises a sorting algorithm adapted for sorting the tiles in a list according to a location of the tiles in the representation, wherein the rendering unit is further adapted for:

assigning an unambiguous distance value to each of the identified tiles according to a position of the tile in the list, storing a default buffer value in the buffers of the image pixels, and sequentially rendering the identified tiles, the rendering beginning with a first tile in the list, wherein at least a portion of a tile is displayed by a multitude of image pixels, and wherein the rendering comprises comparing the buffer values of image pixels and the distance value of a presently rendered tile, wherein the location of the tiles is a distance between the observation point or the center point of the representation and the nearest side of the bounding box.

21. A mobile device comprising:

a display adapted for displaying a representation of a portion of a three-dimensional surface, and a rendering unit for rendering data representing physical features of the portion of the three-dimensional surface, the data being apportioned into a multitude of tiles at a plurality of different detail levels, the representation comprising a multitude of image pixels, a buffer being assigned to each image pixel, wherein the rendering unit is adapted for identifying tiles that need to be rendered and comprises a sorting algorithm adapted for sorting the tiles in a list according to a location of the tiles in the representation, wherein the rendering unit is further adapted for:

assigning an unambiguous distance value to each of the identified tiles according to a position of the tile in the list, storing a default buffer value in the buffers of the image pixels, and sequentially rendering the identified tiles, the rendering beginning with a first tile in the list, wherein at least a portion of a tile is displayed by a multitude of image pixels, and wherein the rendering comprises comparing the buffer values of image pixels and the distance value of a presently rendered tile, wherein the default buffer value and the distance value that is assigned to the first tile in the list are the minimum and maximum values in a number range of the buffer, wherein the buffer is a 23 bit buffer and the default buffer value is 0 and the distance value assigned to the first tile in the list is 255.

22. A mobile device comprising:

a display adapted for displaying a representation of a portion of a three-dimensional surface, and a rendering unit for rendering data representing physical features of the portion of the three-dimensional surface, the data being apportioned into a multitude of tiles at a plurality of different detail levels, the representation comprising a multitude of image pixels, a buffer being assigned to each image pixel, wherein the rendering unit is adapted for identifying tiles that need to be rendered and comprises a sorting algorithm adapted for sorting the tiles in a list according to a location of the tiles in the representation, wherein the rendering unit is further adapted for:

assigning an unambiguous distance value to each of the identified tiles according to a position of the tile in the list, storing a default buffer value in the buffers of the image pixels, and sequentially rendering the identified tiles, the rendering beginning with a first tile in the list, wherein at least a portion of a tile is displayed by a multitude of image pixels, and wherein the rendering comprises comparing the buffer values of image pixels and the distance value of a presently rendered tile, wherein the default buffer value and the distance value that is assigned to the first tile in the list are the minimum and maximum values in a number range of the buffer, wherein the buffer is a 23 bit buffer and the default buffer value is 255 and the distance value assigned to the first tile in the list is 0.

* * * * *

UNITED STATES PATENT AND TRADEMARK OFFICE
CERTIFICATE OF CORRECTION

PATENT NO. : 9,443,344 B2  
APPLICATION NO. : 14/275389  
DATED : September 13, 2016  
INVENTOR(S) : Chatry Page 1 of 1

It is certified that error appears in the above-identified patent and that said Letters Patent is hereby corrected as shown below:

In Column 6, Line 64, delete "In step 160" and insert -- In step 160, --, therefor.

In Column 7, Line 4, delete "In FIG. 5a" and insert -- In FIG. 5a, --, therefor.

In Column 7, Line 41, delete "In FIG. 6b" and insert -- In FIG. 6b, --, therefor.

In Column 7, Line 54, delete "In FIG. 6c" and insert -- In FIG. 6c, --, therefor.

In Column 8, Line 36, in Claim 1, delete "comprising" and insert -- comprising: --, therefor.

In Column 10, Line 21, in Claim 14, delete "23 bit" and insert -- 8 bit --, therefor.

In Column 10, Line 51, in Claim 15, delete "23 bit" and insert -- 8 bit --, therefor.

In Column 11, Line 2, in Claim 16, delete "tiles, and" and insert -- tiles, --, therefor.

In Column 11, Line 4, in Claim 16, delete "pixels," and insert -- pixels, and --, therefor.

In Column 13, Line 2, in Claim 21, delete "23 bit" and insert -- 8 bit --, therefor.

In Column 14, Line 15, in Claim 22, delete "23 bit" and insert -- 8 bit --, therefor.

Signed and Sealed this  
Twentieth Day of June, 2017

Joseph Matal  
*Performing the Functions and Duties of the  
Under Secretary of Commerce for Intellectual Property and  
Director of the United States Patent and Trademark Office*